US010187343B2

(12) United States Patent
Maginnis et al.

(10) Patent No.: US 10,187,343 B2
(45) Date of Patent: Jan. 22, 2019

(54) LOCATION DATA FOR DEFINING PLACES AND TRAFFIC

(71) Applicant: Facebook, Inc., Menlo Park, CA (US)

(72) Inventors: Patrick Brendan Maginnis, San Francisco, CA (US); Michael John McKenzie Toksvig, Palo Alto, CA (US); Erick Tseng, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 403 days.

(21) Appl. No.: 14/575,903

(22) Filed: Dec. 18, 2014

(65) Prior Publication Data

US 2016/0182424 A1    Jun. 23, 2016

(51) Int. Cl.
*G06F 15/16* (2006.01)
*H04L 12/58* (2006.01)
(Continued)

(52) U.S. Cl.
CPC ............. *H04L 51/20* (2013.01); *H04L 51/32* (2013.01); *H04L 67/22* (2013.01); *H04W 4/021* (2013.01);
(Continued)

(58) Field of Classification Search
CPC ..... H04W 4/023; H04W 4/021; H04W 4/025; H04W 4/027; H04L 12/1845; H04L 67/22; H04L 63/1425
See application file for complete search history.

(56) References Cited

U.S. PATENT DOCUMENTS 8,812,344 B1    8/2014  Saurabh et al.
2010/0279708 A1  11/2010  Lidsröm
(Continued)

FOREIGN PATENT DOCUMENTS

JP    2011075474 A    4/2011
JP    2013509622 A    3/2013
WO    WO2013106856 A1  7/2013

OTHER PUBLICATIONS

International Search Report and Written Opinion for International Application No. PCT/US2014/071479, dated Sep. 17, 2015.
(Continued)

*Primary Examiner* — Tauqir Hussain
(74) *Attorney, Agent, or Firm* — Baker Botts L.L.P.

(57) ABSTRACT

In one embodiment, a computing device selects a number of location updates from users which corresponds to a place. Each location update includes data indicating a geographic location that a user was at, and a time corresponding to when the user was at the geographic location. The computing device selects a first subset of the location updates which have geographic locations within a particular geographic area. For each location update in the first subset, the computing device determines a corresponding user and time. The computing device selects a second subset of location updates, each location update in the second subset corresponding to a user from the first subset, and a time within a threshold time of the time of the location update in the first subset. The computing device generates a probability map based on a distribution of geographic locations corresponding to the location updates in the second subset.

19 Claims, 12 Drawing Sheets

(51) Int. Cl.
   *H04W 4/029* (2018.01)
   *H04L 29/08* (2006.01)
   *H04W 4/02* (2018.01)
   *H04W 64/00* (2009.01)
   *H04W 4/021* (2018.01)

(52) U.S. Cl.
   CPC .......... *H04W 4/027* (2013.01); *H04W 4/029* (2018.02); *H04W 64/006* (2013.01)

(56) References Cited

U.S. PATENT DOCUMENTS

| | | | |
|---|---|---|---|
| 2013/0246175 A1* | 9/2013 | Bilange | H04L 67/20 705/14.53 |
| 2013/0267251 A1* | 10/2013 | Khorashadi | H04W 4/023 455/456.3 |
| 2013/0267253 A1 | 10/2013 | Case | |
| 2013/0345957 A1 | 12/2013 | Yang | |
| 2014/0172553 A1 | 6/2014 | Goulart | |
| 2014/0258201 A1 | 9/2014 | Finlow-Bates | |
| 2014/0304212 A1 | 10/2014 | Shim | |
| 2014/0340405 A1* | 11/2014 | dos Santos | G06T 11/206 345/440 |
| 2015/0235266 A1* | 8/2015 | Jain | G06Q 30/0261 705/14.58 |

OTHER PUBLICATIONS

Extended European Search Report received from the European Patent Office, dated Apr. 19, 2016.
JP Office Action received from JPO for Patent Application No. 2017-532898. (with English Translation) dated Oct. 9, 2018.

\* cited by examiner

LOCATION DATA FOR DEFINING PLACES AND TRAFFIC

TECHNICAL FIELD

This disclosure generally relates to location services and identifying and defining locations.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may receive periodic location updates from one or more users of the social-networking system. The location updates may be provided from a mobile device of the user by various methods, such as check-ins, by accessing an application of the social-networking system on the mobile device, or by periodic location updates sent by the mobile device. Each location update may contain a geographic location of the user, and a time corresponding to the user being at the geographic location. The social-networking system may receive a plurality of location updates which may be associated with a particular place, such as a store. The social-networking system may receive a number of location updates comprising check-ins at the particular place, and determine a centroid region based on the distribution of the geographic location updates for each check-in. The social-networking system may determine that all other location updates within the centroid region are also associated with the particular place. The social-networking system may determine one or more users associated with the location updates within the centroid region. The social-networking system may determine for each of the one or more users one or more location updates sent within a threshold time period before and after the time of the location update within the centroid region.

In particular embodiments, the social-networking system may generate a heat map of the location updates sent by the one or more users within the threshold period of time. The social-networking system may generate a probability map based on the heat map, wherein each point on the probability map represents a likelihood that a user starting at the centroid region would go to that point. The social-networking system may determine one or more boundaries based on the probability map, for instance where there are significant changes in probability.

In particular embodiments, the social-networking system may determine one or more boundaries of a particular pathway, based on one or more location updates sent by users moving along the pathway. The location distribution of the users on a pathway may be used to generate a centroid region or line for the pathway. The social-networking system may then monitor location updates sent by moving users within a the centroid region. A heat map and probability map may be generated for the moving users, and one or more boundaries determined.

In particular embodiments, the social-networking system may determine the existence and boundaries for a particular unidentified place. The social-networking system may determine that a particular geographic location has a density of location updates which exceeds a threshold density, and determine that a place exists. The social-networking system may determine a distribution of location updates sent from within the dense region, and determine a centroid region for the dense region. The social-networking system may monitor location updates sent within the centroid region to generate a heat map for users within the centroid region, and a probability map. One or more boundaries of the unidentified place may be determine. The social-networking system may use one or more demographic characteristics of the users sending the location updates to classify the place.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

In an embodiment according to the invention, a method comprises:
by a computing device, selecting a plurality of location updates corresponding to a place, the plurality of location updates being received from one or more users, wherein each location update comprises:
data indicating a geographic location that a user was at; and
a time stamp indicating a time when the user was at the geographic location;
by a computing device, selecting a first subset of the location updates, wherein the location updates in the first subset correspond to geographic locations within a geographic area;
by a computing device, for each of one or more of the location updates in the first subset:
determining the user corresponding to the location update; and
determining the time corresponding to the location update;
by a computing device, selecting a second subset of the location updates, wherein each of the location updates in the second subset corresponds to:
a user corresponding to a location update in the first subset; and
a time within a threshold amount of time of the time corresponding to the location update in the first subset;
by a computing device, generating a probability map based on a distribution of geographic locations corresponding to the location updates in the second subset; and
by a computing device, defining one or more boundaries corresponding to the place based at least in part on the probability map.

In an embodiment according to the invention, the method further may comprise storing the one or more boundaries in one or more map data stores of a computing device.

The geographic area of the first subset may comprise a centroid region of a location distribution of geographic locations corresponding to the plurality of location updates.

The centroid region may be defined by a predetermined radius with respect to a centroid point of the location distribution.

The centroid region may be defined by a shape such that a predetermined proportion of the geographic distributions are within a predetermined distance of the centroid region.

The plurality of location updates may be received during a predetermined time period.

Each location update further may comprise user information associated with the user.

The plurality of location updates may be filtered by one or more demographic characteristics of the one or more users.

The place may be a pathway.

The plurality of location updates along a pathway may be determined based on a moving speed calculated for each location update.

The place may be associated with a geographic area defined in one or more map data stores accessible by the computing device.

The place may be not associated with an geographic area defined in one or more map data stores accessible by the computing device.

The geographic area and the place may be added to one or more map data stores accessible by the computing device.

The geographic area and the place may further be associated with one or more demographic characteristics of users sending location updates from the geographic area.

In an embodiment according to the invention, the method further may comprise sending a query to one or more users corresponding to location updates within the geographic area, the query comprising a request for further defining information associated with the geographic area.

In an embodiment according to the invention, the method further may comprise validating the probability map based at least in part on a comparison of the probability map with the second subset of location updates.

The probability map may be adjusted based at least in part on the comparison.

The one or more boundaries may be adjusted based at least in part on the comparison.

In a further embodiment according to the invention, which can be claimed as well, one or more non-transitory, computer-readable storage media embody software that is operable when executed to:
select a plurality of location updates corresponding to a place, the plurality of location updates being received from one or more users, wherein each location update comprises:
data indicating a geographic location that a user was at; and
a time stamp indicating a time when the user was at the geographic location;
select a first subset of the location updates, wherein the location updates in the first subset correspond to geographic locations within a geographic area;
for each of one or more of the location updates in the first subset:
determine the user corresponding to the location update; and
determine the time corresponding to the location update;
select a second subset of the location updates, wherein each of the location updates in the second subset corresponds to:
a user corresponding to a location update in the first subset; and
a time within a threshold amount of time of the time corresponding to the location update in the first subset;
generate a probability map based on a distribution of geographic locations corresponding to the location updates in the second subset; and
define one or more boundaries corresponding to the place based at least in part on the probability map.

In a further embodiment according to the invention, which can be claimed as well, a system comprises:
one or more processors; and
a memory coupled to the processors comprising instructions executable by the processors, the processors being operable when executing the instructions to:
select a plurality of location updates corresponding to a place, the plurality of location updates being received from one or more users, wherein each location update comprises:
data indicating a geographic location that a user was at; and
a time stamp indicating a time when the user was at the geographic location;
select a first subset of the location updates, wherein the location updates in the first subset correspond to geographic locations within a geographic area;
for each of one or more of the location updates in the first subset:
determine the user corresponding to the location update; and
determine the time corresponding to the location update;

select a second subset of the location updates, wherein each of the location updates in the second subset corresponds to:
a user corresponding to a location update in the first subset; and
a time within a threshold amount of time of the time corresponding to the location update in the first subset;
generate a probability map based on a distribution of geographic locations corresponding to the location updates in the second subset; and
define one or more boundaries corresponding to the place based at least in part on the probability map.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

DESCRIPTION OF EXAMPLE EMBODIMENTS

Figure 1:
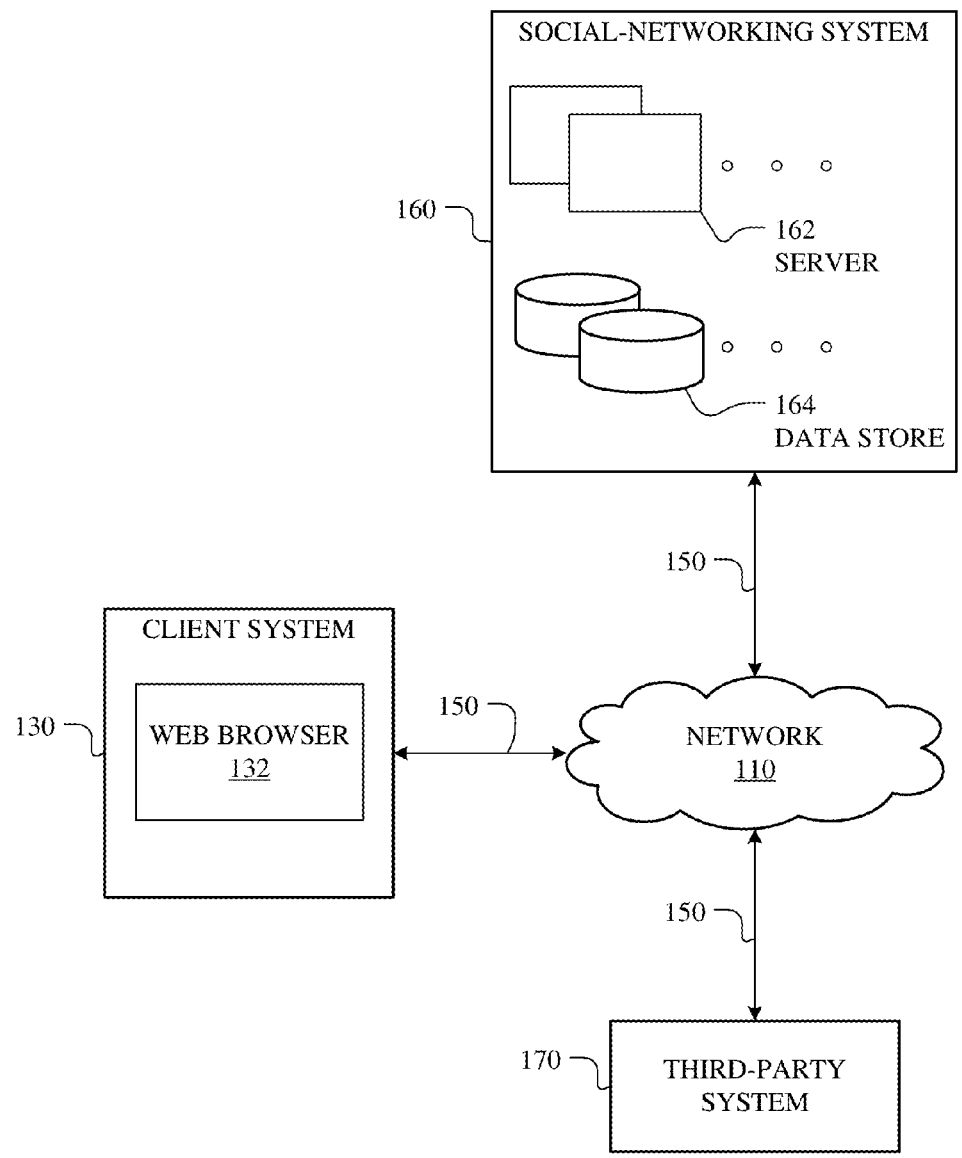
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, the social-networking system 160 may determine a geographic location (hereinafter also simply "location") of an object (e.g., a user, a concept, or a mobile-client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a mobile-client system 130 equipped with cellular, Wi-Fi, GPS, or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations. The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, which is incorporated by reference herein). The social-networking system 160 may allow users to access information regarding a location using a client application (e.g., a web browser or other suitable application) hosted by a mobile-client system 130. As an example and not by way of limitation, social-networking system 160 may serve webpages (or other structured documents) to users that request information about a location. In addition to user profile and location information, the system may monitor or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a mobile-client system 130, access the geo-social-networking system to register the user's presence at the location. The social-networking system 160 may automatically check-in a user to a location based on the user's current location and past location data (such as, for example, as described in U.S. patent application Ser. No. 13/042,357, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

In particular embodiments, social-networking system 160 may be able to automatically and without any manual input from the user, monitor the location of mobile client system 130. Social-networking system 160 may poll or "ping" the mobile client system 130 at pre-determined intervals to obtain location information through an application of mobile client system 130 running in a background mode. In response to the ping, the application of mobile client system 130 may activate a location service of mobile client system 130. In particular embodiments, a process on mobile client system 130 may periodically send location updates to social-networking system 160. In particular embodiments, location updates may be provided by a mobile client system 130 through any suitable means such as cell tower triangulation, Wi-Fi based location services, or tracking Bluetooth MAC addresses. In particular embodiments, a place may determine the location of one or more users within the place based on any suitable method, and provide the location information to social-networking system 160. Social-networking system 160 may adjust the polling frequency or sampling duration based on various factors. Background location updates are further described in U.S. Patent Application Publication No. 2013/0331119, filed 6 Feb. 2013, and U.S. patent application Ser. No. 13/323,915, filed 3 Jul. 2014, which are incorporated by reference herein.

In particular embodiments, social-networking system 160 may determine the location of a user by other information provided to social-networking system 160. As an example and not by way of limitation, social-networking system 160 may receive data indicating a user transaction at a store, such as a record of a purchase at the store. Social-networking system 160 may determine that at the time of the purchase, the particular user was at the location of the store. As another example and not by way of limitation, social-networking system 160 may receive information indicating a check-in relating to a user. The check-in may be provided by the user referenced in the check-in, or by another user who is connected to the referenced user on social-graph 200.

In particular embodiments, a user may actively provide his or her location to social-networking system 160 through an application running in the foreground of a mobile client system 130 associated with the user. As an example and not by way of limitation, when a user accesses an application for social-networking system 160 on a mobile client system 130, mobile client system 130 may be configured to send its current location to social-networking system 160. Mobile client system 130 may determine its location at the time that the application of social-networking system 160 is opened. In particular embodiments, mobile client system 130 may store location updates in a data store of mobile client system 130. When an application of social-networking system 160 is opened, mobile client system 130 may determine if there is a recent location update for mobile client system 130. If there is a recent location update, mobile client system 130 may send the recent location update to social-networking system 160. If there is no recent location update, mobile client system 130 may determine its current location and send the current location to social-networking system 160. In particular embodiments, social-networking system 160 may record that the user provided a location update through a foreground location update.

In particular embodiments, social-networking system 160 may store location updates sent by all users of social-networking system 160 on a particular location database. The location database may store the geographic location for each location update sent by its users, with associated time stamps and user identification information. As an example and not by way of limitation, the location updates may be visualized on a heat map for all users or a subset of users. In particular embodiments, the heat map may be generated for a particular period of time. As another example and not by way of limitation, a heat map may be generated to visualize the location updates sent by all users residing in a particular city for a particular week.

Figure 2:
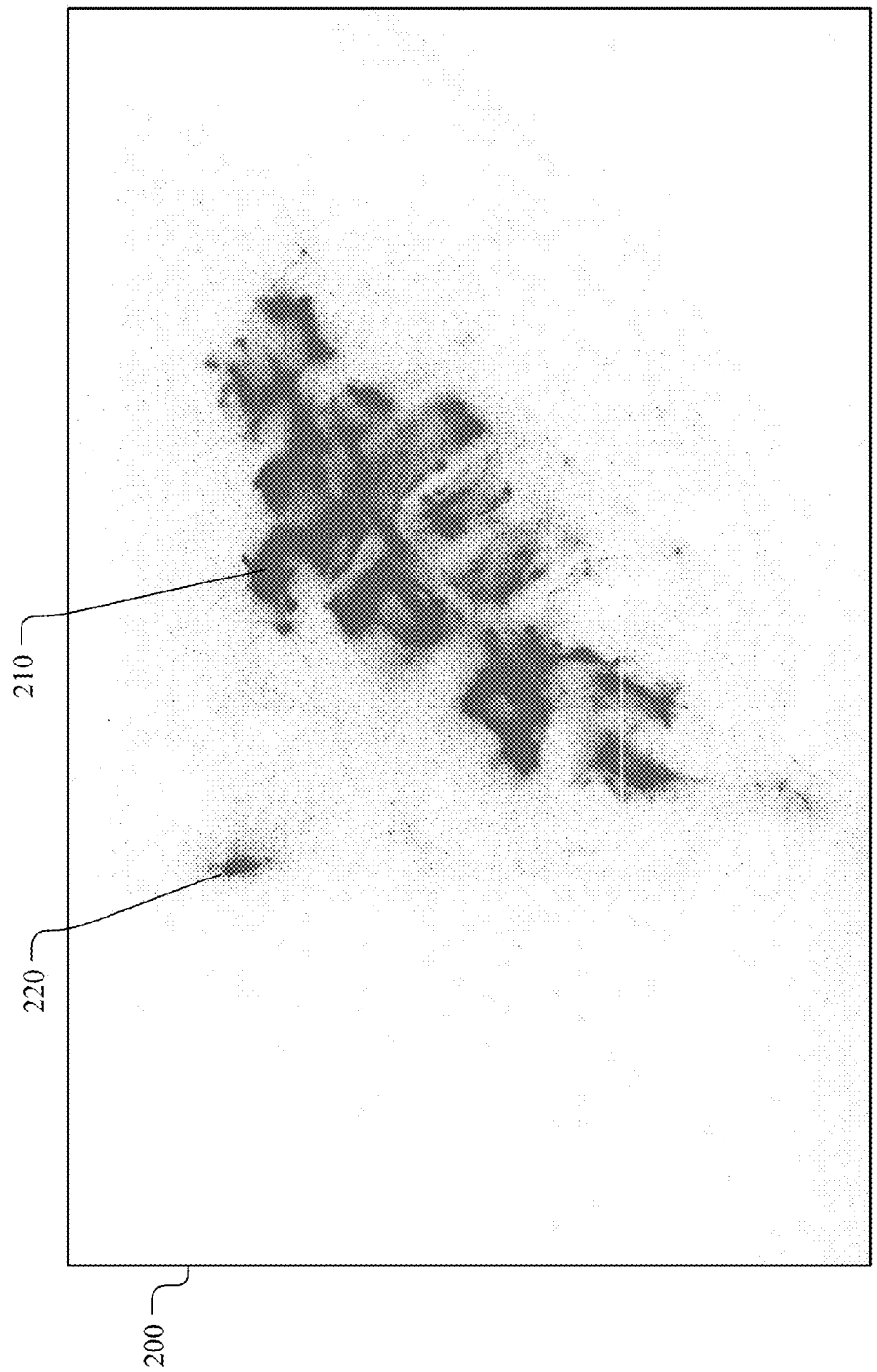
FIG. 2 illustrates an example heat map of location updates.

FIG. 2 illustrates an example embodiment of a heat map for users of social-networking system 160. In the example of FIG. 2, each point represents a location update sent by a user through a background location update. Areas 210 and 220 which appear darker or denser on the heat map of FIG. 2 correspond to areas from which more location updates were sent. In particular embodiments, an area with a high density of location updates may be determined by a large number of users sending location updates at the same time. As an example and not by way of limitation, a large number of location updates may be sent within a few hours for a sporting event in a particular venue. In particular embodiments, a high-density area of location updated may be determined by a relatively smaller number of users sending many location updates from the same location over a period of time. As an example and not by way of limitation, for a particular office building, the users working at the office building may each send multiple location updates over the course of a work week. In the example of FIG. 2, area 210 may correspond to an office campus, with multiple buildings and pathways connecting the buildings. In this example, the location updates sent from each area corresponding to a building may be sent by a subset of all users in area 210, but for the entire day. As another example in FIG. 2, area 220 may correspond to a transit stop (e.g. a bus stop) that most employees of the office campus of area 210 utilize. The locations updates sent from area 220 may then only correspond to location updates sent in the morning, and in the evenings, but may be sent by all users of area 210.

In particular embodiments, social-networking system 160 may determine exact boundaries of a particular place, location, or pathway by using a heat map. As an example and not by way of limitation, a place such as a restaurant may have defined boundaries on a map accessible to social-networking system 160. However, the defined boundaries may be inaccurate, or the physical boundaries of the restaurant building may not be truly representative of the locations of users visiting the restaurant. As another example, if the restaurant has a patio seating area which does not appear on the map, social-networking system 160 may not be able to determine that the patio area should be considered to be part of the restaurant.

In particular embodiments, in addition to background location updates, social-networking system 160 may receive as inputs other actions of users that may be associated with the user being present at a particular place. As an example and not by way of limitation, social-networking system 160 may access transaction information relating to user transactions at the particular place, such as a purchase made at the particular place with a payment method associated with the user. As another example, the user may redeem an offer provided to the user for the particular place. If the offer requires that the user visit the particular place in order to redeem the offer, social-networking system 160 may determine that at the time the offer is redeemed, the user's location is at the particular place. As another example, the user may check-in at the particular place, or may be checked-in at the particular place by another user of social-networking system 160. In particular embodiments, the check-in information sent to social-networking system 160 may additionally comprise the geographic location of the user at the time of the check-in. In particular embodiments, if another user checks-in a particular user at a particular place, social-networking system 160 may determine a current location of the particular user by sending a request for a location update to a mobile client system 130 of the particular user. As an example and not by way of limitation, if user A checks-in user B to store C, social-networking system 160 may request a location update of user B in response to the check-in.

In particular embodiments, for a particular place, social-networking system 160 may determine a group of users who have checked-in to the particular place. In particular embodiments, social-networking system 160 may consider all users who have at least one check-in at the particular place, and at least one location update sent by the same users. As an example and not by way of limitation, a user may check-in to a restaurant while outside in the patio seating area of the restaurant. Social-networking system 160 may record the user's location on the patio and the check-in at the restaurant.

Figure 3:
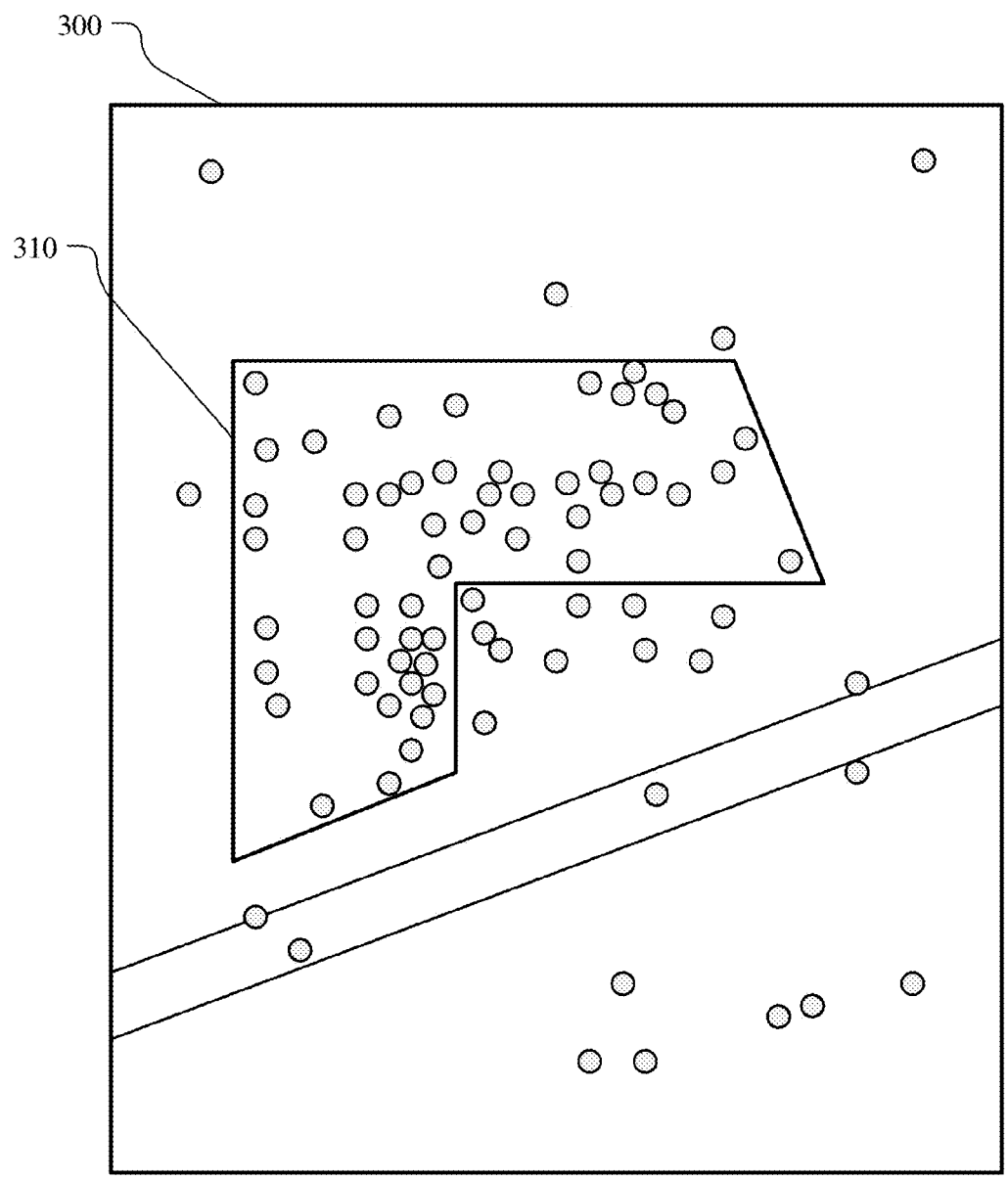
FIG. 3 illustrates an example map of location updates sent from a particular place.

FIG. 3 illustrates an example map 300 depicting a number of location updates sent within a particular geographic area. The geographic area within map 300 may comprise a known place 310. In particular embodiments, social-networking system 160 may consider all location updates ever received by social-networking system 160 in map 300 for the region depicted in map 300. In particular embodiments, social-networking system 160 may filter the location updates in map 300. As an example and not by way of limitation, social-networking system 160 may only consider location updates sent within the past year. This may reduce any errors introduced by past location updates. For example, if place 310 was only built two years previously, and there was no building before then (or another completely different type of place), then the location updates sent by users three years ago would not be relevant. As another example, if social-networking system 160 were to consider location updates sent from the geographic region of Levi's Stadium in Santa Clara, Calif., social-networking system 160 would only consider location updates sent from 2014 onwards, as the stadium did not open until that year. In particular embodiments, filtering the location updates may additionally serve to reduce computational costs, particularly for locations that have a high number of visitors. As an example and not by way of limitation, social-networking system 160 may filter location updates sent from the vicinity of AT&T Park in San Francisco, Calif., to only consider location updates sent in the previous year. If social-networking system 160 did not apply such a filter, the number of location updates would require higher computational costs to analyze, for minimal gains in accuracy. As another example, social-networking system 160 may filter the location updates by a demographic characteristic of the users sending the location updates. Social-networking system 160 may, for example, only consider location updates sent by users ages 34-49 for a particular map 300, if social-networking system 160 is interested in monitoring the location updates sent by that particular group of users.

In particular embodiments, social-networking system 160 may determine the location distribution of the users who have checked-in or been checked-in at the particular place, and determine a centroid of the location distribution. As an example and not by way of limitation, social-networking system 160 may record 50 check-ins at a particular store. Social-networking system 160 may determine the average of the geographic locations of each check-in to determine a centroid for the group of 50 locations. In particular embodiments, social-networking system 160 may determine a region around the centroid, wherein social-networking system 160 determines that the likelihood of a user who is within the area also being within the place is extremely high. As an example and not by way of limitation, social-networking system 160 may draw a circle around the centroid, with a predefined radius. In particular embodiments, social-networking system 160 may define a region around the centroid such that a particular proportion of the check-in locations are within a particular distance of the centroid region. As an example and not by way of limitation, social-networking system 160 may draw an irregular shape around the centroid for a particular place, such that 75% of the check-in locations are within 20 yards of the centroid. In particular embodiments, the size of the centroid region may be adjusted based on the size of the place, As an example and not by way of limitation, a circle around the centroid of check-in locations for a large department store may be larger than the circle for a small shop. As another example, in the case where social-networking system 160 is defining a shape so that most check-in locations are within a particular distance from the shape, the distance requirement may be greater for a larger place. In particular embodiments, the size of the centroid region may also be adjusted based on the type of users who visit the place, and a type of place. As another example, a different-sized circle may be used for a kiosk in a mall which has a lot of frequent, short-term visitors, versus a movie theater in the same mall whose visitors may stay at the theater for a longer time. In particular embodiments, the size of the centroid region may be based on the variation in location of the checked-in users. Social-networking system 160 may determine that the more spread-out the checked-in users are, the more likely it may be that the place is correspondingly larger, and users within a greater area may have a very high probability of being within the particular place.

Figure 4:
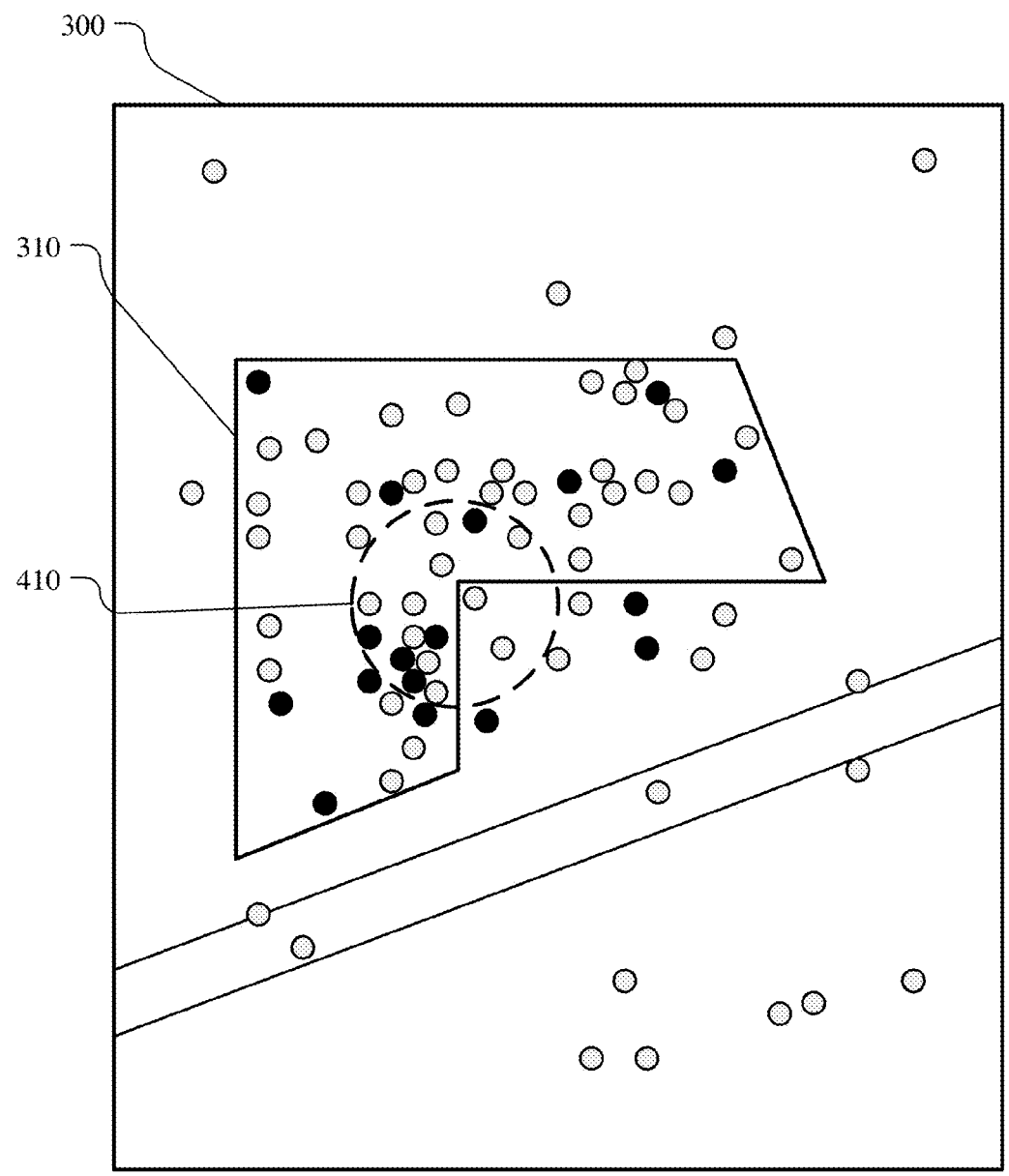
FIG. 4 illustrates an example map of location updates with check-ins identified and a centroid of the check-ins determined.

FIG. 4 illustrates an example map 300 similar to the map of FIG. 3, with location updates corresponding to check-ins highlighted. Based on the highlighted location updates, social-networking system 160 may identify a centroid region 410 which surrounds the centroid of the location distribution for the highlighted location updates. The size of centroid region 410 may be adjusted as described above based on factors such as the type of place being checked-into. In particular embodiments, centroid region 410 may overlap entirely with an area of place 310. In particular embodiments, at least a part of centroid region 410 may not overlap with the area of place 310, as in the example of FIG. 4. In particular embodiments, centroid region 410 may be larger than the currently mapped area of place 310. As an example and not by way of limitation, if the place 310 is a booth in a mall, the centroid region for users checking in to the booth may cover an area surrounding the booth, which is larger than the area of the booth itself.

In particular embodiments, social-networking system 160 may determine a seed group of users, wherein the users of the seed group have sent at least one location update from within the centroid region. In particular embodiments, some of the users in the seed group may have sent check-ins from near the centroid of the check-in users. In particular embodiments, users of the seed group may have sent a background location update while traversing the centroid region. In particular embodiments, social-networking system 160 may determine that any user within the seed group was at the particular place when the location update was sent.

In particular embodiments, social-networking system 160 may determine for each user in the seed group their location updates in a time period immediately preceding and following the location update within the centroid region. As an example and not by way of limitation, social-networking system 160 may determine for each seed group user their locations within 5 or 10 minutes before and after being within the centroid region. In particular embodiments, social-networking system 160 may only monitor seed group users who have remained within the centroid region for a particular amount of time. As an example and not by way of limitation, some users detected at the centroid region may have location updates 5 minutes before and 5 minutes afterwards which are very distant from the centroid. Social-networking system 160 may determine that these users are merely traveling through, e.g. driving past the particular place, or simply walking through the place to go somewhere else. In particular embodiments, social-networking system 160 may determine that within the time period sampled (e.g. 5 minutes before and 5 minutes after being in the centroid region), a seed group user is likely to remain within the same place, or will leave the particular place and go to a new location distant from the particular place. As an example and not by way of limitation, for adjoining stores in a strip mall, social-networking system 160 may determine that it is highly likely that once a user visits a particular store in a strip mall, the user will subsequently remain at the particular store, or will travel elsewhere. Social-networking system 160 may determine that there is a very low likelihood that the user will subsequently travel to an adjoining store. In this example, social-networking system 160 may determine a location distribution of the seed group users, wherein any location within a particular distance of the centroid region is determined to be at the place, and any location outside the particular distance is determined to be outside the place. As an example and not by way of limitation, social-networking system 160 may estimate a radius around the centroid region, outside which a user is very unlikely to still be at the particular place. Any location updates outside the radius may be considered to not be at the particular place.

Figure 5:
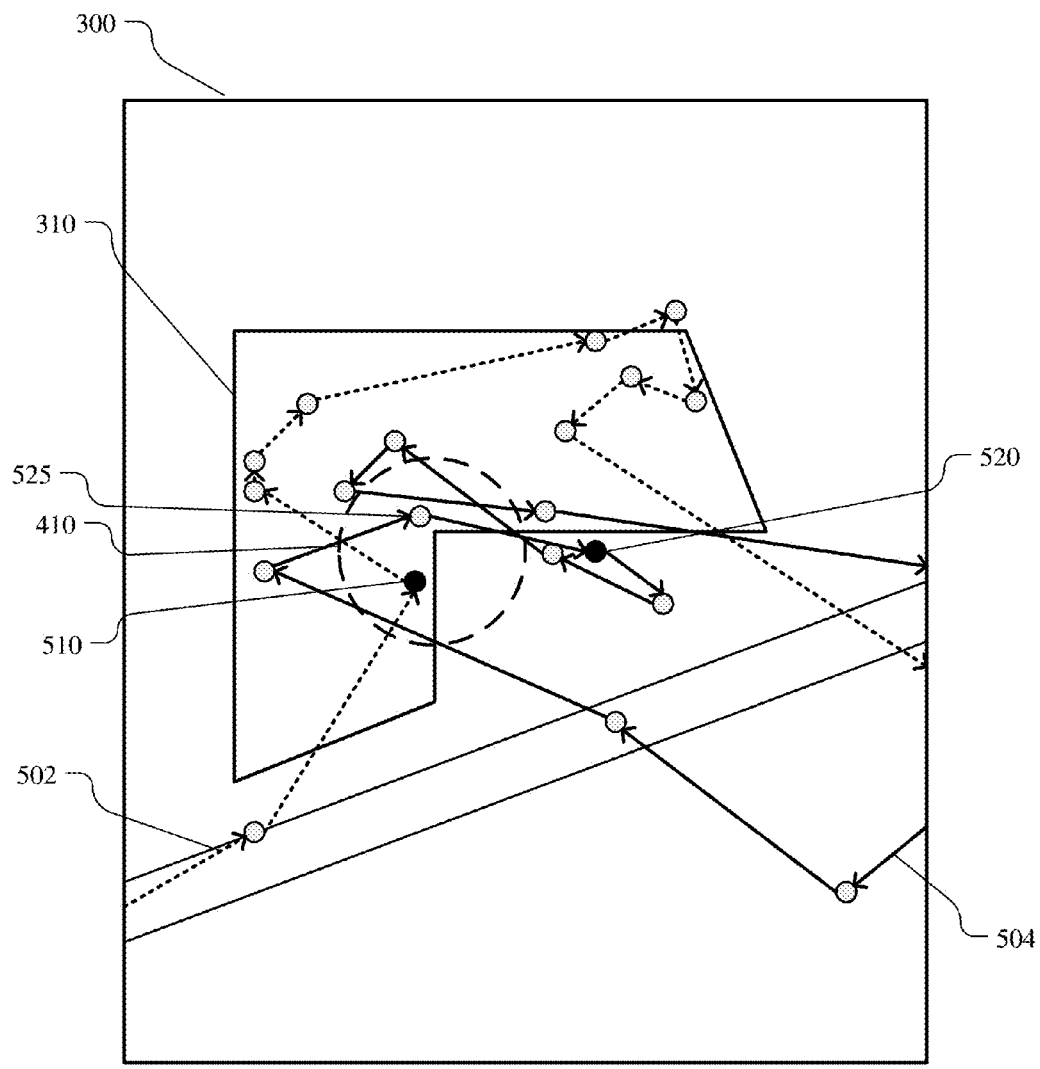
FIG. 5 illustrates an example map of location updates sent by a seed group of users.

FIG. 5 illustrates an example map view of location updates sent by seed group users. For illustrative purposes, the example map 300 of FIG. 5 shows the location updates sent by two users 502 and 504 who checked in at place 310. In the example of FIG. 5, user 502 sent a check-in location update 510 from within centroid region 410, while user 504 sent a check-in location update 520 outside centroid region 410, but had sent a location update 525 from within centroid region 410 immediately prior to the check-in 520. The example of FIG. 5 shows users 502 and 504 each making multiple location updates while at or near place 310. Social-networking system 160 may be able to determine an order to the location updates for each user based on the time corresponding to each location update. In particular embodiments, social-networking system 160 may consider all location updates sent by users 502 and 504 while they are within a threshold distance of centroid region 410. As an example and not by way of limitation, social-networking system 160 may include all location updates sent by users 502 and 504 that are within 100 yards of centroid region 410, and were respectively sent on the same days as location updates 510 and 525. In particular embodiments, social-networking system 160 may determine a threshold time for recording location updates proximate in time to location updates 510 and 525. As an example and not by way of limitation, social-networking system 160 may only consider location updates from user 502 that were sent within 10 minutes of location update 510, and location updates from user 504 that were sent within 10 minutes of location update 525. In particular embodiments, if check-in 520 occurs more than 10 minutes after location update 525, social-networking system 160 may discard check-in location 520 from consideration.

In particular embodiments, for all location updates determined to be at the place from the seed group of users, social-networking system 160 may generate a heat map of location updates sent by that group of users. This seed group heat map may represent the movements of users who have a high likelihood of having visited the particular place. As an example and not by way of limitation, based on 20 check-ins at a particular place, social-networking system 160 may determine a centroid region for the particular place. The centroid region may encompass five of the checked-in users, as well as ten other users who have not checked-in to the particular place, but sent a location update from within the centroid region. Social-networking system 160 may then determine the location history of those fifteen users immediately before and after entering the centroid region to generate a heat map for their movements.

In particular embodiments, based on the heat map of the seed group users, social-networking system 160 may determine a probability map for the particular place. The probability map may depict a likelihood that a user starting at the centroid will subsequently travel to a particular point in time. As an example and not by way of limitation, social-networking system 160 may divide the area comprising the particular place into small granular areas. The granular areas may be squares, for example one-meter squares. The probability map for a given square may represent the probability that a user starting at the centroid of the user distribution for that place will end up at that particular square. In particular embodiments, the probability for a particular square may be represented as a decimal from 0.00 (no chance that a user would end up at that square) to 1.00 (a user starting from the centroid always ends up at the particular square). In particular embodiments, the probability may be represented as a percentage from 0% to 100%.

In particular embodiments, social-networking system 160 may weigh the probability for a particular square based on the linear distance between the square and the centroid. This may account for the fact that a probability that a user will randomly enter that square will decrease as a function of the distance between the centroid and the square. As an example and not by way of limitation, if a centroid for a particular place is close to the southern boundary of the particular place, then users may have a higher likelihood of randomly entering another square on the southern side of the particular place than the northern side. To ensure that a heat map and probability map for the particular place are not affected by the location of the centroid, location updates or probabilities for the northern section of the particular place may be adjusted upward by a factor. As an example and not by way of limitation, the probability for a particular square may be multiplied by a factor that increases with distance.

In particular embodiments, social-networking system 160 may determine that one or more "hot pathways" exist in the particular place based on the heat map. As an example and not by way of limitation, a bookstore may have a central pathway along the bookshelves, and most users visiting the bookstore may travel down that pathway. On the heatmap, the pathway may show up as a densely-visited region within the particular place. In particular embodiments, social-networking system 160 may treat the entire length of the pathway as the centroid. As an example and not by way of limitation, social-networking system 160 may adjust the probability for a particular square based on the closest distance from the pathway to the square, rather than the centroid. This may allow social-networking system 160 to adjust the probability for particular squares based on the distance that the user traveled from the "hot" pathway.

In particular embodiments, social-networking system 160 may determine one or more boundaries of the particular place based on the probability map. In particular embodiments, the boundaries may be determined by where there is a significant change in probability. As an example and not by way of limitation, social-networking system 160 may determine that for a particular group of squares that are arranged in a line, the probability for a user entering any of those squares is about 10%. Social-networking system 160 may then determine that for an adjacent line of squares, the probability drops to about 2%. Social-networking system 160 may determine that this difference in probability is indicative of a boundary. In particular embodiments, the boundary may correspond to a physical boundary, such as a wall of the particular place. In particular embodiments, the boundary may correspond to a functional boundary, e.g. a region of the particular place may have a sign posted reading "Employees Only Beyond This Point," and so most users will not enter that region. Social-networking system 160 may view the change in probability between the Employees-Only region and the rest of the particular place as a boundary. In particular embodiments, social-networking system 160 may determine that no boundary exists along a particular wall, because the other side of the wall is functionally the same place. As an example and not by way of limitation, a restaurant may have an outdoor seating area that is separated from the interior of the restaurant by a door and a wall. However, while the physical boundary exists, the probability map may depict users travelling freely from within the restaurant to the patio. In this example, social-networking system 160 may determine a boundary exists along the edges of the patio, but not between the patio and the interior of the restaurant.

Figure 6:
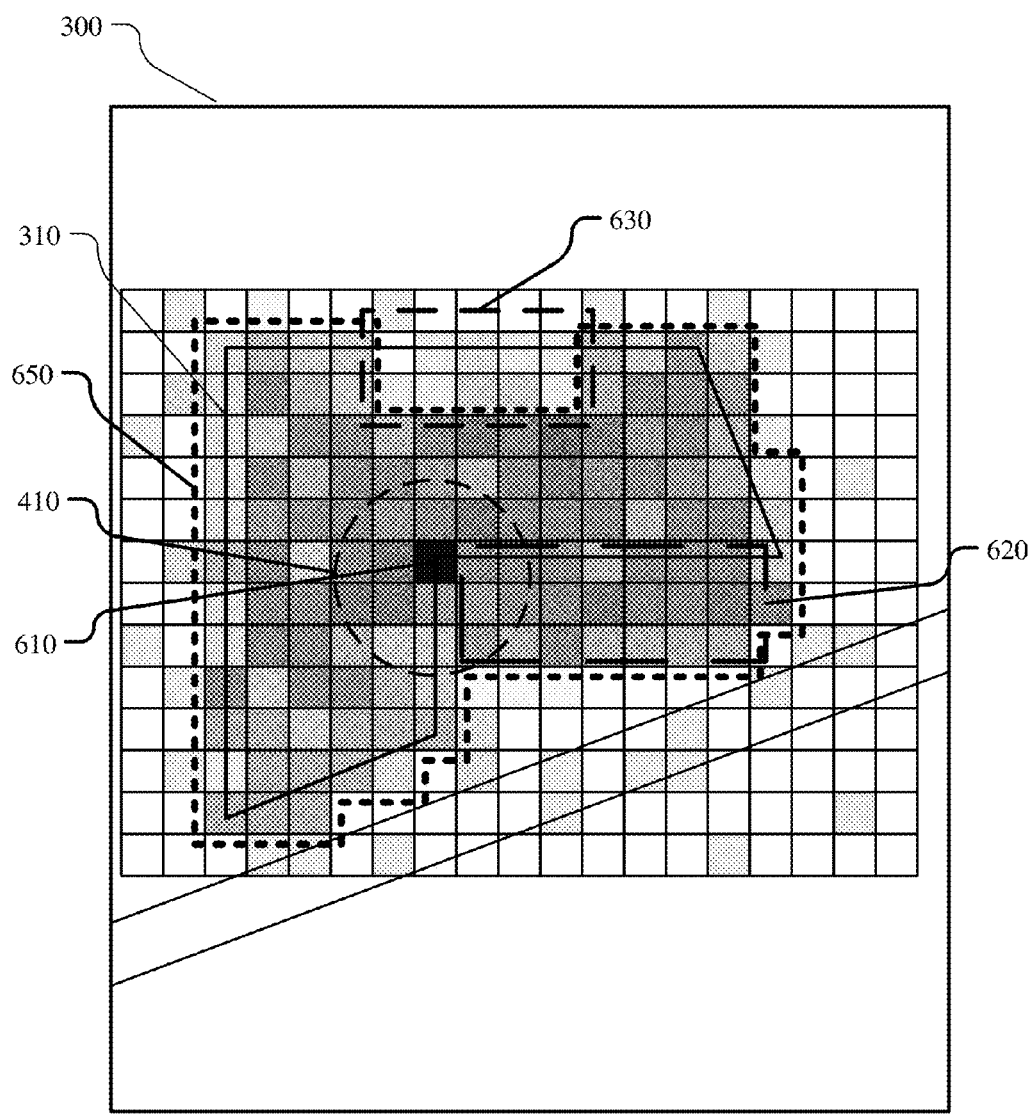
FIG. 6 illustrates an example probability map based at least in part on the location updates sent by a seed group of users.

FIG. 6 illustrates an example probability map for a particular place 310. The region of map 300 surrounding and including place 310 may be divided into smaller discrete areas. In the example of FIG. 6, the area has been divided into smaller square. In particular embodiments, smaller squares such as one-meter squares may be used. The probability map may represent a probability that a user starting at a square 610 in centroid region 410 will end up at the particular square. In the example of FIG. 6, each square is shaded to represent a probability, with darker shades indicating a greater probability. In particular embodiments, social-networking system 160 may determine that a significant change in probability between adjacent squares may signify a boundary. Social-networking system 160 may then determine a defined area 650 for place 310. In particular embodiments, the boundaries determined by the change in probability may not correlate to the estimated boundaries of place 310 on a map. As an example and not by way of limitation, in the example of FIG. 6, region 620 may be determined to be a part of place 310, although the mapped boundaries of place 310 do not include region 620. This may be because region 620 is an outdoor area which is still associated with place 310, for example an outdoor seating patio. As another example from FIG. 6, region 630 may be determined to not be a part of place 310. This may be because region 630 corresponds to an area of the building not frequented by anyone; for example, a storage area or machinery area. Social-networking system 160 may determine that region 630 may be functionally excluded from the defined area for place 310.

In particular embodiments, social-networking system 160 may determine a boundary exists based on the absolute change in probability between adjacent squares. As an example and not by way of limitation, social-networking system 160 may determine that a boundary exists if the probability changes by more than 5% between adjacent squares. As an example, if a particular square is determined to have a 25% probability, and the adjacent square has a 20% probability, then social-networking system 160 may determine a boundary exists. Under the same criterion, if two adjacent squares have probabilities of 6% and 1%, social-networking system 160 would determine a boundary exists as well. In particular embodiments, the boundary determination may be made by a proportional difference in probability. As an example and not by way of limitation, social-networking system 160 may determine a boundary exists if the probability between two adjacent squares is halved. In this example, if two adjacent squares have probabilities of 25% and 20%, social-networking system 160 may determine that there is no boundary between the squares. However, if the two adjacent squares have probabilities of 6% and 1%, social-networking system 160 may determine that the second square has less than half the probability of the first square, and determine a boundary exists.

In particular embodiments, social-networking system 160 may consider changes in probability along multiple squares. As an example and not by way of limitation, social-networking system 160 may determine a boundary exists if there is a change in probability of at least 10% between four consecutive squares. In this example, if squares A, B, C, and D are aligned in a row and have respective probabilities of 25%, 18%, 17%, and 16%, social-networking system 160 may determine that there is no boundary between any of the squares A, B, C, and D, even though there is a significant drop between squares A and B. As another example, if squares E, F, G, and H are aligned in a row and have respective probabilities of 25%, 21%, 17%, and 13%, social-networking system 160 may determine that a boundary exists somewhere between squares A and D based on the combined change in probability. In particular embodiments, social-networking system 160 may determine a boundary exists if there is a proportional change in probability over multiple squares.

In particular embodiments, social-networking system 160 may use a smoothing function for one or more determined boundaries of a particular place. As an example and not by way of limitation, a probability map may show a straight-line boundary along a set of squares, then a "divot" where one square along the line has a significantly lower probability due to random chance, or because there is a physical barrier in that immediate area (e.g. a column). Rather than determine that the boundary of a place has a one-square meter region missing from the edge, social-networking system 160 may determine that the place should have a smooth edge, and ignore the particular low-probability square. In particular embodiments, social-networking system 160 may require a minimum length for the edges of a boundary for a place. As an example and not by way of limitation, social-networking system 160 may determine that a boundary should comprise a straight-line at least two meters in length. This method would also account for randomly-low-probability squares on the probability map.

In particular embodiments, social-networking system 160 may determine a boundary by comparing a particular square to the other squares already determined to be within the particular place. As an example and not by way of limitation, social-networking system 160 may start with an initial group of squares adjacent to the centroid, where the probability is very high. Social-networking system 160 may then compare the probability of the initial group of squares with the probability in adjacent squares. If the adjacent squares do not have a threshold change in probability, social-networking system 160 may add the square to the initial group. If the adjacent square does have a difference in probability exceeding the threshold, social-networking system 160 may determine that the particular group should not be added to the initial group. In particular embodiments, social-networking system 160 may continue comparing adjacent squares to the initial group until no more squares can be added to the group. Social-networking system 160 may determine that the area covered by the group of squares is the area of the particular place.

In particular embodiments, social-networking system 160 may determine a set of boundaries for a particular place that defines the outer boundaries of the particular place. As an example and not by way of limitation, social-networking system 160 may adjust the parameters required to determine a boundary exists as described above to ensure that an enclosed region is defined by the boundaries. As another example, using an initial set of parameters for determining a boundary, social-networking system 160 may determine boundaries for three sides of a particular place, but be unable to close off the boundaries based on the probability map for the fourth side. In particular embodiments, social-networking system 160 may adjust the determination of a boundary until a boundary is determined for the fourth side that may be aligned with the existing boundaries.

In particular embodiments, social-networking system 160 may validate the boundaries determined by the probability map by comparing the mapped boundaries to the location updates sent by the seed group of users. As an example and not by way of limitation, social-networking system 160 may compare the location updates from each seed group to determine if any are outside the defined boundaries of the particular place. If locations are very far away from the boundary, social-networking system 160 may determine that those location updates were not sent from the particular place, and may ignore them. In particular embodiments, if a location update is sent just outside the defined boundaries (e.g. a seed group user sends a location update 10 yards outside the defined boundary), social-networking system 160 may determine that the seed group user was still within the particular place. Social-networking system 160 may determine if the boundary should be adjusted based on the location update. In particular embodiments, this determination may be based on the outlier location update, as well as the probability map near the boundary and the location update. As an example and not by way of limitation, social-networking system 160 may recalculate the boundary near the outlier location update by increasing the required change in probability to define the boundary. This may result in the boundary being moved further out, and the outlier location update being placed within the area of the particular place. As another example, if adjusting the parameters for defining a boundary results in social-networking system 160 being unable to define a boundary in that region, social-networking system 160 may choose to keep its calculated boundaries, and keep the outlier location update outside the boundary.

Figure 7:
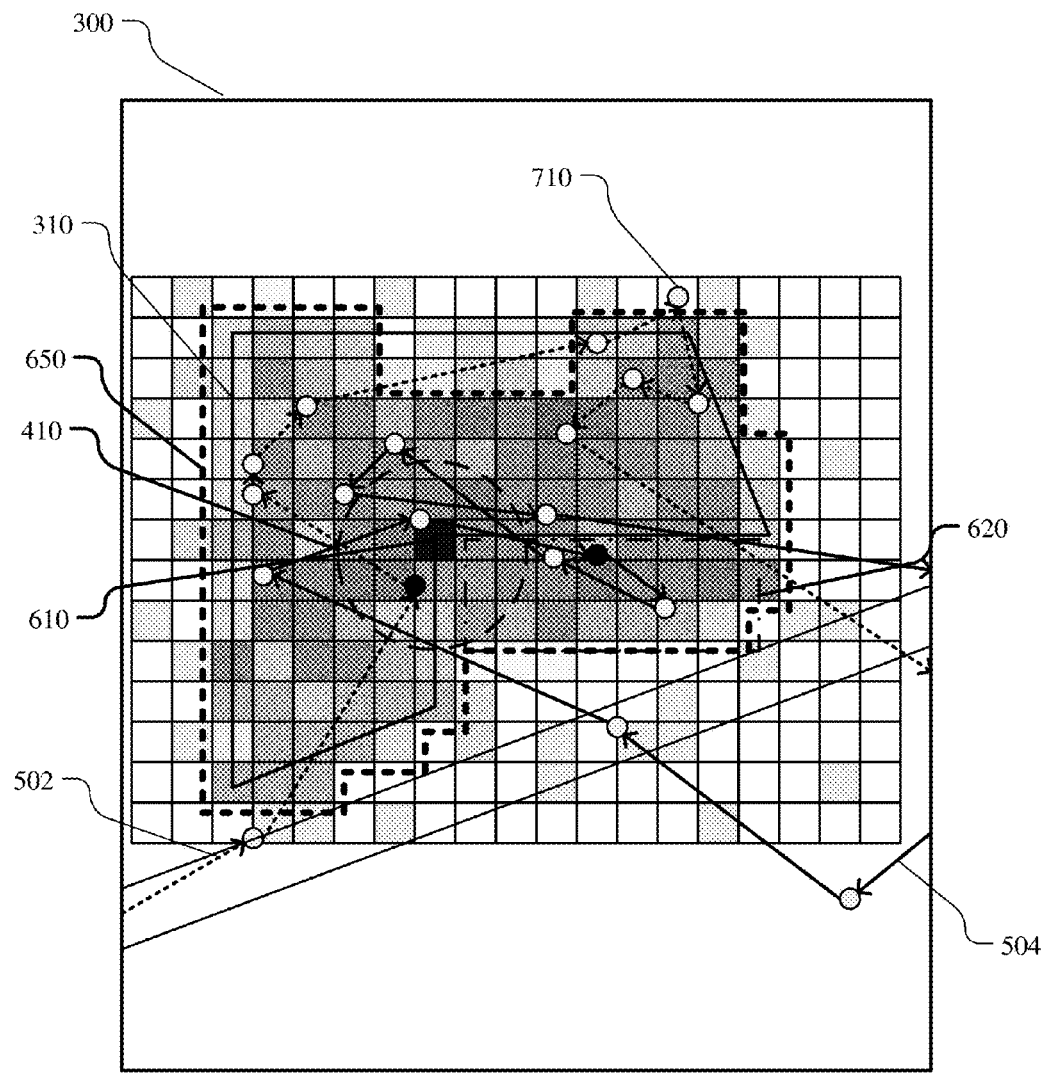
FIG. 7 illustrates an example probability map with location updates sent by the seed group users.

FIG. 7 illustrates an example embodiment of a map for validating the boundaries determined by a probability map. In FIG. 7, the location updates sent by users 502 and 504 (as described in FIG. 5) may be projected onto the probability map for place 310 with defined area 650. Social-networking system 160 may determine if any location update sent by users 502 and 504 fall outside the defined area 650. In the example of FIG. 7, user 504 enters region 620, which is outside the originally-mapped area for place 310, but has been determined to be functionally within place 310. As another example, user 502 has sent a location update 710 which may be just outside defined region 650. Social-networking system 160 may determine whether the defined region 650 should be adjusted so that location update 710 fall within defined region 650. As an example and not by way of limitation, social-networking system 160 may increase the threshold change in probability required for determining a boundary, so that the square surrounding location update 710 is not excluded from defined region 650. In particular embodiments, social-networking system 160 may adjust one or more procedures for drawing boundary lines to include location update 710. As an example and not by way of limitation, social-networking system 160 may remove a requirement that the boundary be smooth, so that the edge of defined region 650 is extended to cover location update 710. In particular embodiments, social-networking system 160 may determine that it is unnecessary to adjust defined region 650, and consider location update 710 to be an outlier. As an example and not by way of limitation, social-networking system 160 may determine that location update 710 has a margin of error such that it could be within defined region 650, or that user 502 really did step out of place 310 at the location of location update 710.

In particular embodiments, social-networking system 160 may weight location updates based on whether they correspond to users who checked-in at the particular place. As an example and not by way of limitation, user A may check into place B and send further location updates from place B (including from within the centroid region), and user C may not have checked-in at place B but has sent location updates from near place B (including from within the centroid region). When determining a probability map, social-networking system 160 may accord location updates from user A more weight than the location updates from user C, so that the squares near the location updates from A are determined to have a greater probability. In particular embodiments, this may account for users like user C who have randomly entered the centroid region for place B without actually visiting place B. Conversely, user A may be determined to definitely be a visitor of place B based on the check-in. In particular embodiments, social-networking system 160 may adjust the parameters for defining boundaries to ensure that location updates sent by checked-in users are not excluded from the defined area of the particular place, while not making such adjustments if users not checked-in to the particular place have location updates outside the defined area.

In particular embodiments, social-networking system 160 may adjust the centroid region, seed group, probability map, or determination of boundaries for two particular places that are adjacent to each other, e.g. sharing a common boundary. In particular embodiments, one or more factors for defining the area of each place may be adjusted to account for erroneous determination of which users are visiting which place. As an example and not by way of limitation, two stores, A and B, may be adjacent to each other. Store A may have its cash registers along the shared wall between A and B. If a lot of users visiting store A happen to check-in at A while waiting at the cash register, the centroid of the checked-in users may be located very close to the cash registers, and the shared wall. In this example, a centroid region may be drawn such that part of the region actually lies in the area of store B. In this example, if social-networking system 160 were to determine a seed group for the centroid region of store A, many users that are actually visiting store B may be grouped into the seed group. If social-networking system 160 attempts to determine a probability map and defined boundaries based on this centroid region, most if not all of the area of store B may be included within the defined area for store A. In this example, it may become necessary to redefine the centroid region, or the probability map.

In particular embodiments, social-networking system 160 may determine that one or more users with location updates within a centroid region have checked-in at a different place than the particular place associated with the centroid region. As an example and not by way of limitation, in the example above, social-networking system 160 may determine that some users in the centroid region for store A actually checked-in at store B at nearly the same time. In particular embodiments, social-networking system 160 may exclude location updates sent by those users when determining a probability map for the seed group of users. In particular embodiments, social-networking system 160 may determine whether the centroid or centroid region should be moved based on a number of users who have checked-in at other places. As an example and not by way of limitation, social-networking system 160 may determine that the centroid should be moved if 5% of users within the centroid region have checked-in at a different place. As another example, social-networking system 160 may determine that the centroid or centroid region should be adjusted if ten users within the centroid region have checked-in at a different location. In particular embodiments, social-networking system 160 may adjust the centroid region by determining the minimum distance and direction required to move the centroid so that the number of erroneous users (e.g. users checking-in elsewhere) within the centroid region is below the threshold count or proportion. In particular embodiments, social-networking system 160 may adjust the size of the centroid region by determining the maximum size of the region that reduces the number of erroneous users below the threshold.

In particular embodiments, social-networking system 160 may use the defined area of a particular place to adjust the defined area of another place. As an example and not by way of limitation, in the examples given above, the centroid region for store A may include users who are actually visiting store B, meaning that the probability map for store A may erroneously include the area of store B. In particular embodiments, social-networking system 160 may have independently determined the defined area of store B based on a centroid, centroid region, and seed group for store B. In particular embodiments, if the centroid region for store B does not overlap any other place, social-networking system 160 may be able to accurately determine a defined area for store B. If social-networking system 160 then determines the defined area of store A, social-networking system 160 may determine that there is an overlap between the defined areas for store A and store B. In particular embodiments, the overlap may be attributed to store A and store B actually being on different floors. If this is not the case (e.g. store A and store B are known to be on the same floor, or social-networking system 160 is otherwise unable to determine that stores A and B are actually at different elevations), social-networking system 160 may exclude the defined area of store B from the defined area for store A, so that the defined areas do not overlap.

In particular embodiments, social-networking system 160 may correlate location updates sent by particular users to information shared by those users to social-networking system 160. As an example and not by way of limitation, a user Alice may indicate on her profile on social-networking system 160 that she is employed at the store Freebirds. When social-networking system 160 subsequently receives location updates from Alice's mobile phone indicating that she is at Freebirds, social-networking system 160 may associate those location updates with an indication that an employee of the particular place is sending those location updates. In particular embodiments, social-networking system 160 may determine employees for particular businesses that have multiple locations. As an example and not by way of limitation, if Alice were to visit another Freebirds location than the one she works at, social-networking system 160 may still consider her an employee for the location update sent from the second Freebirds location. In particular embodiments, if the user is visiting a different business location than the one they work at, they may consider the user to be a normal visiting user. As an example and not by way of limitation, if Alice is visiting another Freebirds location, social-networking system 160 may determine that she is at the other location to eat, not to work.

In particular embodiments, social-networking system 160 may consider location updates sent by employees separately from location updates sent by visiting users. In particular embodiments, social-networking system 160 may increase the sampling period for location updates from employees. As an example and not by way of limitation, if a particular user sends a location update from within the centroid region defined for their workplace (making the employee a seed group user), social-networking system 160 may monitor that employee's movements for several hours before and after, rather than a few minutes. As another example, if an employee is determined to be at their workplace, social-networking system 160 may consider that employee's location history throughout the workday, e.g. 9:00 AM to 5:00 PM, or any other period of time estimated to be the employee's work shift.

In particular embodiments, social-networking system 160 may determine a centroid and centroid region for location updates from employees of a particular place. In particular embodiments, this employee centroid and centroid region may be at a different location than the centroid and centroid region determined for all users. As an example and not by way of limitation, if the particular place is a restaurant, then employees may have many more location updates in the kitchen area, compared to the overall population of users. Therefore, the centroid of location updates for employees may be shifted more towards the area of the kitchen. In particular embodiments, social-networking system 160 may define a seed group of employee users, or may simply consider all employee users while they are at the particular place, and generate a heat map and probability map, to determine the boundaries of the place. The employee-defined area for the particular place may be compared against the area of the place determined for all users. As an example and not by way of limitation, comparing an employee-only map versus an employee+customers map may reveal areas where employees of the particular place go, such as employee-only rooms or pathways.

Figure 8:
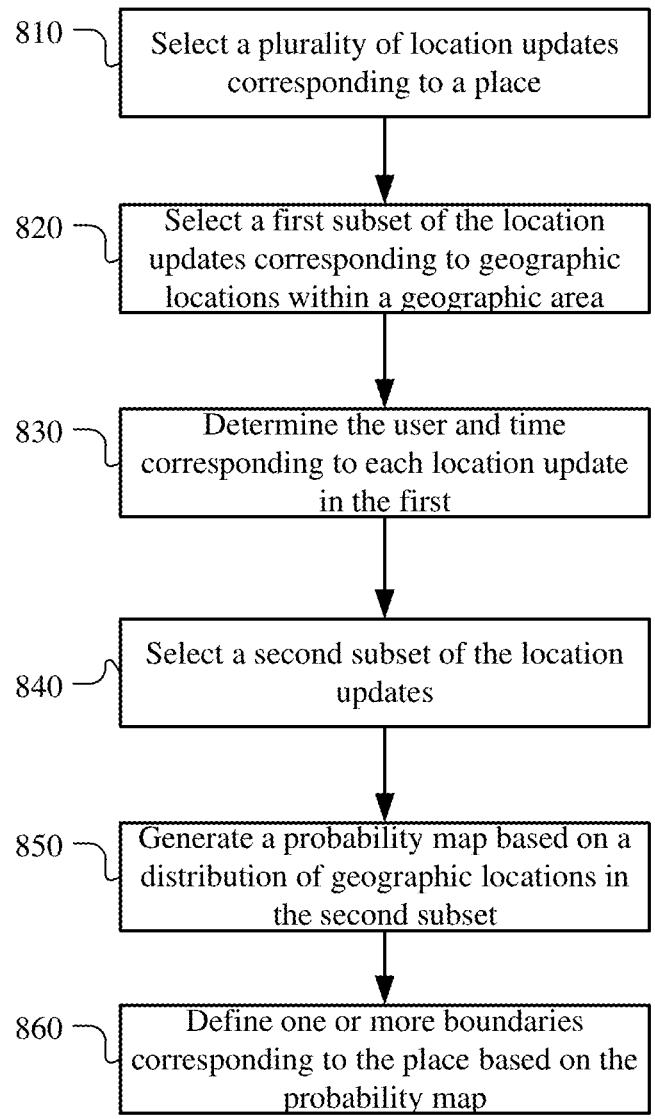
FIG. 8 illustrates an example flowchart for determining one or more boundaries of a particular place.

FIG. 8 illustrates an example method 800 of determining one or more boundaries of a particular place, based on one or more location updates sent by users of a social-networking system. The method may begin at step 810, where social-networking system 160 selects a plurality of location updates that may correspond to a particular place. In particular embodiments, the plurality of location updates may be filtered by time or by the particular users. Determination of whether a location update may correspond to a particular place may be based on distance from the place. As another example, social-networking system 160 may only consider location updates corresponding to user check-ins at the particular place. At step 820, social-networking system 160 may select a first subset of the location updates which correspond to geographic locations within a particular geographic area. As an example and not by way of limitation, social-networking system 160 may select location updates within a centroid region of the location updates. At step 830, for each of the location updates in the first subset, social-networking system 160 may determine a user and time corresponding to the location update. At step 840, social-networking system 160 may then determine a second subset of location updates. In particular embodiments, the second subset of location updates may be defined as location updates sent by the users determined for the first subset, within a threshold amount of time from the time associated with each user's location update from the first subset. At step 850, social-networking system 160 may generate a probability map based on the geographic distribution of location updates from the second subset. Methods for generating the probability map are discussed in detail above. At step 860, social-networking system 160 may determine one or more boundaries corresponding to the particular place, based at least in part on the probability map. In particular embodiments, social-networking system 160 may then store the one or more defined boundaries in a map database.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

In particular embodiments, social-networking system 160 may use the defined areas of the particular place to determine whether users are actually visiting the particular place. As an example and not by way of limitation, determining whether users are actually visiting the particular place may allow social-networking system 160 to accurately estimate a conversion rate for advertisement sent to users of social-networking system 160. This may be more accurate than simply drawing a circle encompassing the particular place and determining if the user is within the circle. This method of defining boundaries may be a significant improvement over drawing circles around a particular place especially for places with irregular shapes that do not fit the shape of a circle.

In particular embodiments, social-networking system 160 may use the heat map of all users of social-networking system 160 to determine that a place or pathway exists where there is no corresponding record in the map database. As an example and not by way of limitation, if a large number of users travel along a foot path that does not appear on any map, but social-networking system 160 is able to receive a number of location updates from users while they are travelling along the foot path, social-networking system 160 may be able to determine that there is some kind of path in that area. As another example, social-networking system 160 may determine that there is an existing permanent or temporary place based on detecting a number of users at a location which does not correspond to any place.

In particular embodiments, social-networking system 160 may determine regions that may comprise unidentified places or pathways based on the overall density of location updates. As an example and not by way of limitation, social-networking system 160 may detect a particular area which has a density of location updates above a threshold density. If the particular area does not correspond to any places known to social-networking system 160, social-networking system 160 may determine that there is a new place that may be defined. In particular embodiments, different threshold densities may be used based at least in part on whether the users detected within the dense region are stationary or moving. If the users are moving, social-networking system 160 may determine that there is a pathway in the unknown region. If the location updates are relatively stationary, social-networking system 160 may determine that there is an unidentified place.

In particular embodiments, social-networking system 160 may define a region for detecting users. As an example and not by way of limitation, social-networking system 160 may define a circle or square around the region with a high density of location updates. In particular embodiments, social-networking system 160 may define the region such that the density of location updates sent from within the defined region exceeds a threshold density. In particular embodiments, only location updates sent within a particular time period may be considered. As an example and not by way of limitation, social-networking system 160 may determine that a place exists only at certain times, e.g. at nights, before Christmas, on the weekends, etc. For identifying pathways, social-networking system 160 may define a line or curve, and a linear distance from the line or curve, such that the density of location updates sent from within the linear distance from the line or curve exceeds a threshold density.

In particular embodiments, social-networking system 160 may determine a centroid of the location updates sent from within the defined region for the unidentified place or pathway. The centroid may represent an average of the geographic locations for each location update sent from within the defined region. Social-networking system 160 may then determine the location updates sent within the defined region by the seed group of users to generate a heat map for the seed group. Based on the heat map, social-networking system 160 may generate a probability map for any user starting at the centroid of the defined region. Based on the probability map, social-networking system 160 may then determine the boundaries and a defined area of the unidentified place.

In particular embodiments, social-networking system 160 may be able to identify one or more characteristics of the seed group of users for an unidentified place. As an example and not by way of limitation, social-networking system 160 may determine that the seed group of users for an unidentified place are predominantly in a particular age group, are from a particular city, attend a particular school, work at a particular place, are a particular gender, share a common interest, etc. Social-networking system 160 may then associate the demographic characteristics of the place with the unidentified place. In particular embodiments, social-networking system 160 may then recommend the unidentified place as a point of interest to other users who are in the same demographic category. As an example and not by way of limitation, for a newly defined place for which the social-networking system 160 has no other information, social-networking system 160 may determine that the seed group of users for the unidentified place are men aged 25-34 who live in Menlo Park, Calif., and are interested in the San Francisco 49ers football team. Social-networking system 160 may determine that most of the location updates sent by the seed group of users are sent in the fall on Sundays, or Monday nights. Social-networking system 160 may determine that some seed group users go to other places other than this unidentified place on some Sundays or Mondays, and those other places are predominantly sports bars. Based on this information, social-networking system 160 may be able to infer that this unidentified location is also a sport bar catering to football fans.

Figure 9:
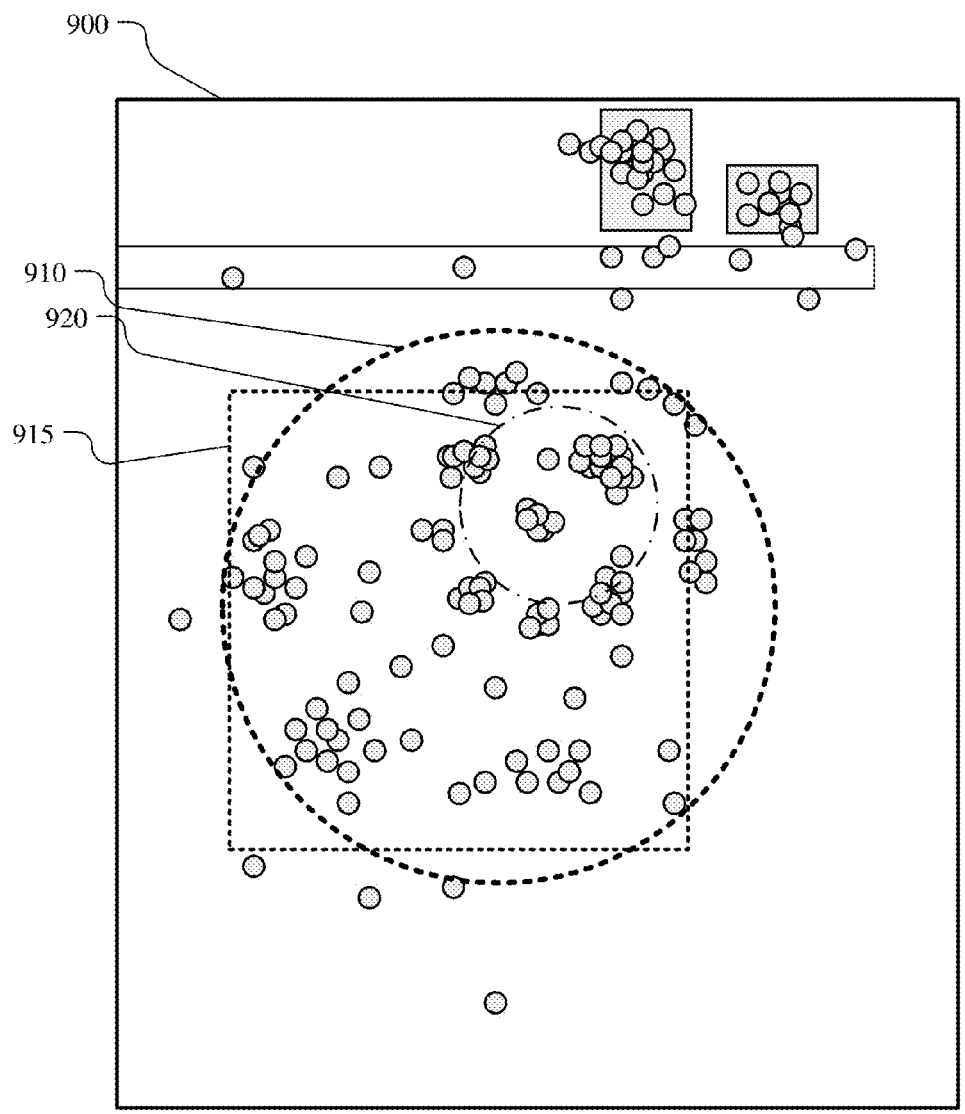
FIG. 9 illustrates an example map of location updates for an unidentified place.

FIG. 9 illustrates an example of a determination of an unidentified place. Social-networking system 160 may receive a plurality of location updates sent for a map region 900 which does not contain any defined places. Social-networking system 160 may determine that there is an area 910 or area 915 which contains at least a threshold density of location updates. Social-networking system 160 may determine a size and shape of area 910 or 915 based on the density of each area 910 and 915, and the number of location updates excluded by either area. Based on the area 910 or 915, social-networking system 160 may determine a centroid region 920. Social-networking system 160 may determine one or more users who have sent location updates from within centroid region 920, and consider those users to be the seed group of users. Based on the location updates sent by the seed group of users, social-networking system 160 may generate a heat map and probability map as discussed above for existing places. Social-networking system 160 may then define one or more boundaries as existing within the map region 900.

In particular embodiments, social-networking system 160 may send a prompt to one or more of the seed group of users asking them to provide further information about the unidentified place. Based on the information provided by the seed group of users, social-networking system 160 may be able to determine additional characteristics or place types for the unidentified place. In particular embodiments, social-networking system 160 may add the unidentified place with its defined area to a map of social-networking system 160 which may be accessible to one or more users. In particular embodiments, the seed group of users may respond to the query with an indication that the unidentified place should be kept "secret." Based on this response, social-networking system 160 may determine that the unidentified place should not be recommended to users who have never been to the unidentified place. Social-networking system 160 may also exclude the unidentified place from any maps of social-networking system 160. In particular embodiments, the seed group of users may be able to adjust the privacy settings regarding the unidentified place so that their friends (e.g. other users who are directly connected to one or more seed group users) or another defined group of users (e.g. other users attending a particular school) may receive recommendations about the unidentified place, or may be able to view the unidentified place on a map. In particular embodiments, the seed group of users may restrict access to information about the place to members of a particular group on social-networking system 160. In particular embodiments, if the seed group of users are all members of a particular group of social-networking system 160, social-networking system 160 may automatically restrict information about the unidentified place to members of that group.

In particular embodiments, if a pathway to be defined is near one or more places, social-networking system 160 may determine a centroid at a location that is not close to any of the nearby places. As an example and not by way of limitation, a particular pathway may be 100 yards long and connect places A, B, and C, where A is at one end of the pathway, C is at the other end (i.e. 100 yards from A), and B is adjacent to the path and 60 yards from A (i.e. 40 yards from B). Social-networking system 160 may determine that the centroid of the location updates along the path is directly in the middle, or 50 yards from A and B. However, this centroid would be only 10 yards from B. Users who are actually at B may be incorrectly determined to be on the path, and vice versa. To reduce the chances of errors, social-networking system 160 may shift the centroid for the pathway to 30 yards from A, and 30 yards from B. Users near this centroid will be determined to be more likely to be on the pathway rather than at any of places A, B, or C.

In particular embodiments, social-networking system 160 may define the boundaries of a pathway. As an example and not by way of limitation, social-networking system 160 may be able to use the location distribution of users traversing a pathway to define the edges of the pathway, e.g. determine the pathway's width and length. In particular embodiments, social-networking system 160 may define the pathway by a line or curve, and determine a number of location updates within a threshold distance of the line or curve. As an example and not by way of limitation, if a particular pathway can be described by a straight line, social-networking system 160 may place the line on the pathway, and determine the location updates sent from within a threshold distance of the line. In particular embodiments, the threshold distance may be adjusted based on the speed of the users sending location updates from the pathway. As an example and not by way of limitation, social-networking system 160 may determine an average speed of users by determining the distance between two consecutive location updates for a particular user, then dividing the distance by the time between the consecutive location updates. In particular embodiments, social-networking system 160 may increase the threshold distance if it determines that the users are travelling faster than a walking or jogging speed. As an example and not by way of limitation, if the average speed of a user on the pathway exceeds 10 miles per hour (mph), social-networking system 160 may determine that the pathway may be a bike trail or a narrow road. If the average speed of a user on the pathway exceeds 35 mph, social-networking system 160 may determine that the pathway is a road or avenue, and adjust the threshold distance to the expected width of such a pathway. If the average speed of a user on the pathway exceeds 60 mph, social-networking system 160 may determine that the pathway is a highway, and increase the threshold distance further.

In particular embodiments, social-networking system 160 may determine a seed group of users based on their location updates on the pathway. In particular embodiments, a seed group of users may be defined by a threshold distance from the centroid of the location updates on the pathway. As an example and not by way of limitation, in the example discussed above for a 100 yard path with places A, B, and C and a centroid 30 yards from A and 30 yards from B, social-networking system 160 may define a seed group of users as users with location updates within 10 yards of the centroid. In particular embodiments, social-networking system 160 may then determine location updates sent by the seed group of users along the pathway. In particular embodiments, social-networking system 160 may exclude location updates sent by the seed group of users if the location update is within a defined area of another place. As an example and not by way of limitation, if a seed group user on the path sends a location update within the defined area for place A, B, or C, social-networking system 160 may determine that the user has then left the pathway to enter one of the places.

In particular embodiments, social-networking system 160 may generate a heat map of the location updates sent by the seed group of users, and generate a probability map based on the heat map using the methods discussed above. Based on the probability map, the edges of the pathway may be determined.

In particular embodiments, social-networking system 160 may determine that a particular pathway only serves to connect two places. As an example and not by way of limitation, there may be a path between places A and B, wherein the users taking that path only use the path to go from A to B or vice versa. Social-networking system 160 may determine the boundaries of the path terminals (e.g. where the path starts and ends) based on the defined areas for A and B. As an example and not by way of limitation, the boundaries of a straight-line path connecting the east side of place A and the west side of place B may be defined as the eastern boundary of place A and the western boundary of place B.

Figure 10A:
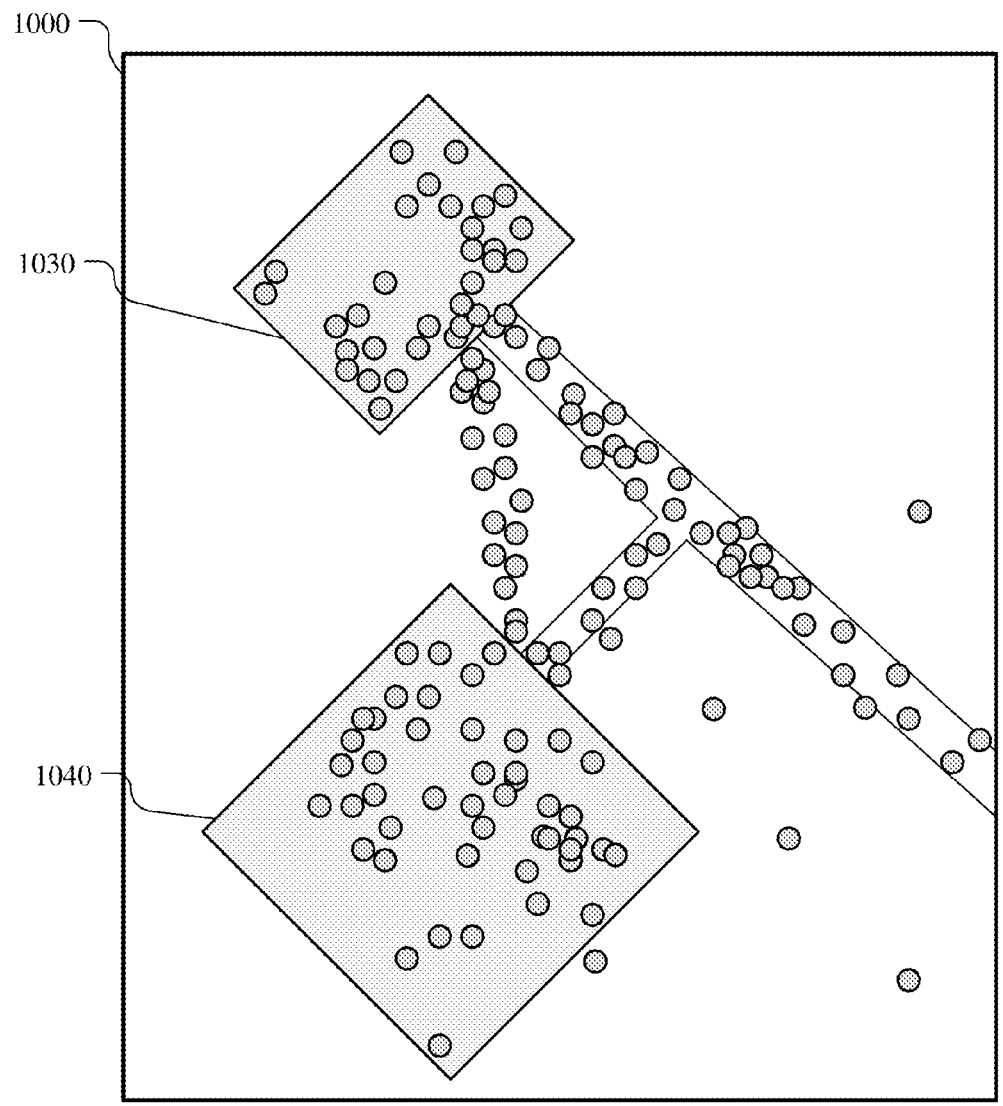
FIG. 10A illustrates an example map of location updates for determining one or more pathways.
Figure 10B:
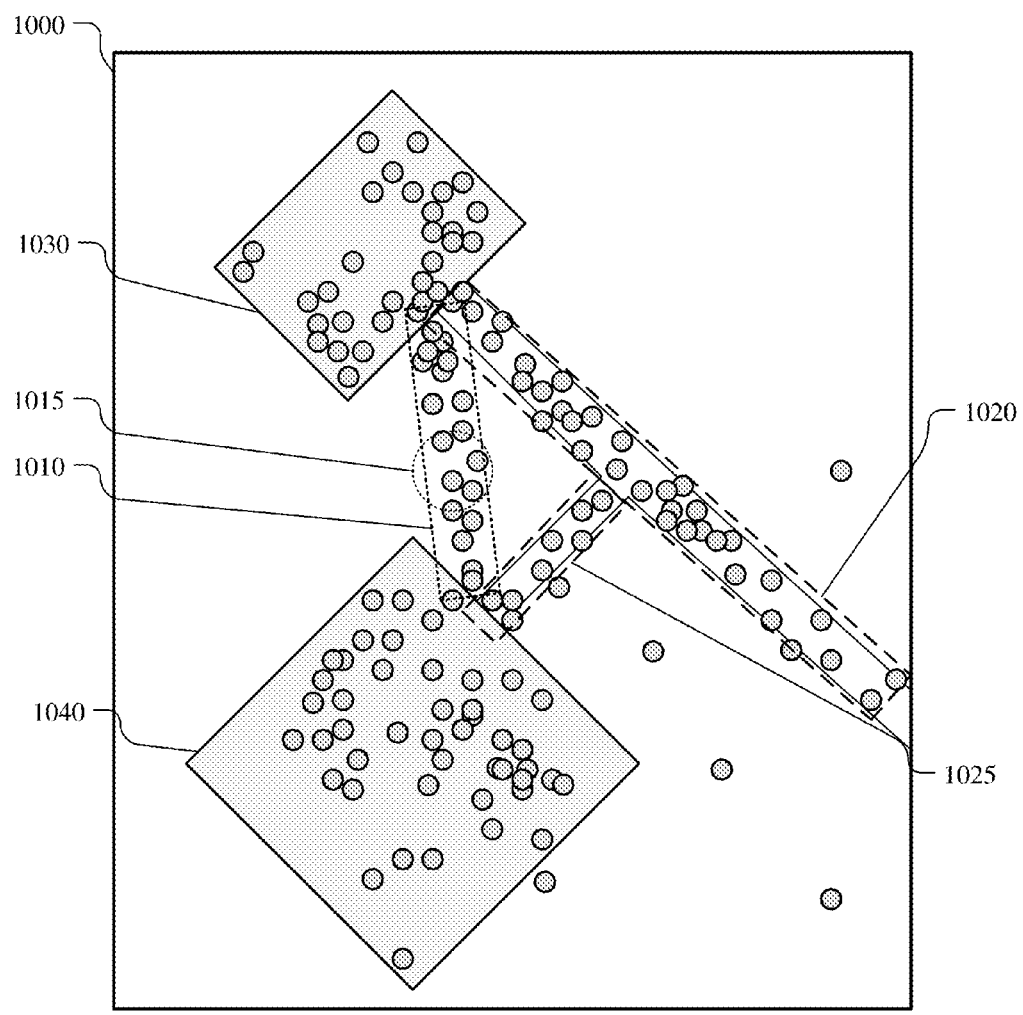
FIG. 10B illustrates an example map of location updates with one or more defined pathways.

FIGS. 10A and 10B illustrate an example of boundaries for one or more pathways being determined based on location updates. FIG. 10A depicts a set of location updates in a map view 1000 which comprises two places 1030 and 1040, as well as location updates sent outside places 1030 and 1040. Location updates sent outside places 1030 and 1040 may correspond to users who were moving at the time of those location updates. As an example and not by way of limitation, social-networking system 160 may determine the speed of a particular user by dividing the distance between consecutive location updates of the user by the time between the same location updates. In particular embodiments, location updates for moving users may correspond to one or more pathways. In particular embodiments, location updates for moving users may not correspond to any places or pathways, but social-networking system 160 may determine that there is a dense region of location updates by moving users within the same region, and determine that a pathway exists. In the example of FIG. 10A, social-networking system 160 may determine that there are several discrete pathways, and proceed to determine one or more boundaries for each pathway. In the example of FIG. 10B, social-networking system 160 may have determined three pathways to be defined: paths 1010, 1020, and 1025. Pathways 1020 and 1025 may be determined by their existence in the map view of 1000. Pathway 1010 may be determined to exist by social-networking system 160 based on a threshold density of moving users within the drawn region 1010. As an example and not by way of limitation, social-networking system 160 may define a region 1010 as having at least a threshold density of location updates sent from moving users. Social-networking system 160 may then define a centroid region 1015 for pathway 1010, determine a seed group of users within centroid region 1015, and aggregate location updates from the seed group of users while they were still on pathway 1010. If a pathway connects two places as pathway 1010 connects places 1030 and 1040, social-networking system 160 may determine that a location update is on pathway 1010 if the location does not correspond to a location of place 1030 or 1040. In other words, if a location update is determined to be at place 1030 or 1040, social-networking system 160 considers that location update to not be on pathway 1010. Social-networking system 160 may generate a probability map of the seed group of users for pathway 1010 while they are on the pathway, and generate one or more boundaries of pathway 1010. Pathways 1020 and 1025 may also have one or more boundaries defined using the methods discussed above. In particular embodiments, the defined boundaries for pathways 1020 or 1025 may not match exactly to the boundaries drawn on a map.

In particular embodiments, social-networking system 160 may determine new pathways exist which are not currently identified on a map. As an example and not by way of limitation, users may be walking along a back trail connecting two buildings rather than taking the sidewalk. In this example, the back trail may be a shorter distance to travel, or a more convenient path to take. In particular embodiments, social-networking system 160 may determine one or more demographic characteristics of users taking an unidentified path. In particular embodiments, social-networking system 160 may identify one or more users who share the same demographic characteristics as the users on the unidentified path. Social-networking system 160 may recommend the path to the identified users, or display the path to the identified users on a map of social-networking system 160. In particular embodiments, social-networking system 160 may send a request to the seed group of users for an unidentified pathway to provide further information about the pathway, such as what type of path it is (e.g. a dirt path, alleyway, sidewalk, etc.) and what places are connected by the pathway. In particular embodiments, the seed group of users may restrict information about the pathway to only friends of the seed group or particular groups of users. As an example and not by way of limitation, the seed group users may indicate that references to and recommendations for the pathway should only be sent to their classmates, co-workers, or co-members of a particular group on social-networking system 160.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 11:
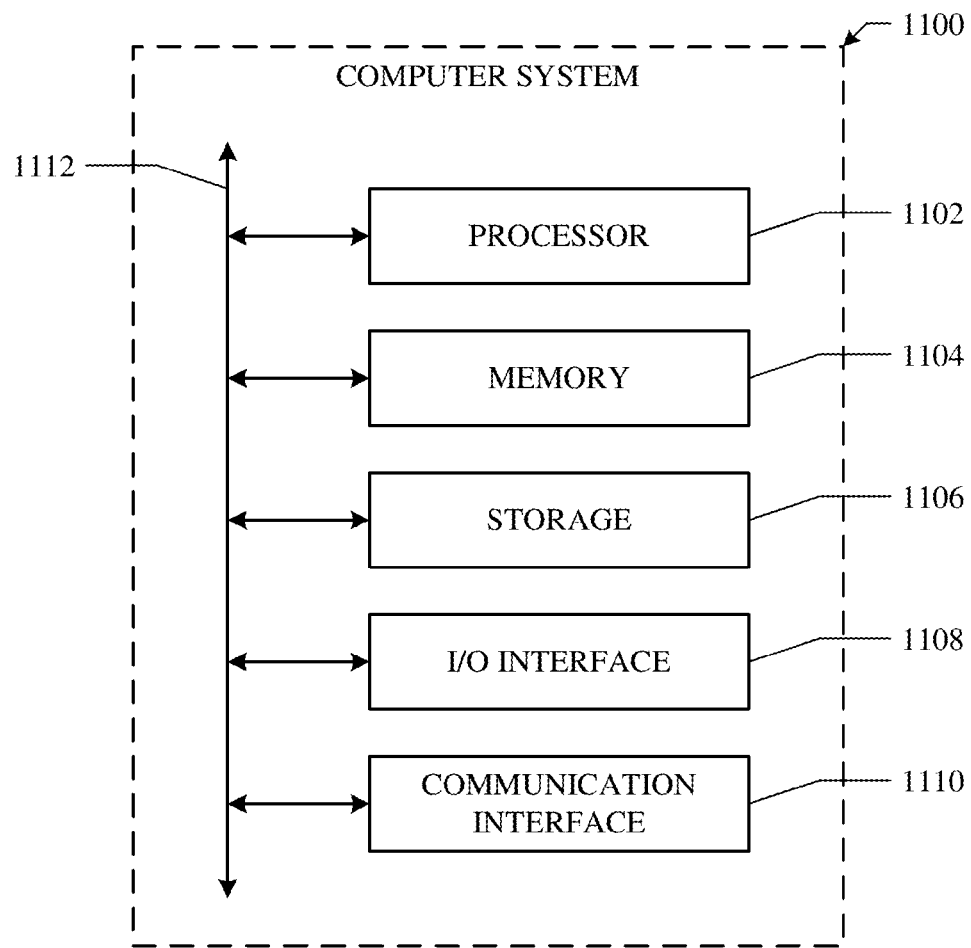
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, selecting a plurality of location updates corresponding to a place in order to determine a probability that one or more users are visitors of the place, the plurality of location updates being received from one or more mobile computing devices respectively corresponding to the one or more users, wherein each location update comprises:
   data indicating a geographic location that a user was at; and
   a time stamp indicating a time when the user was at the geographic location;
   by a computing device, determining a plurality of check-ins at the place by one or more users on an online social network, wherein each of the plurality of check-ins is associated with a geographic location;
   by a computing device, calculating a centroid region corresponding to the place, wherein the centroid region is determined based on the distribution of the plurality of geographic locations associated with the plurality of check-ins;
   by a computing device, selecting a first subset of the location updates, wherein the location updates in the first subset correspond to geographic locations within the centroid region;

by a computing device, for each of one or more of the location updates in the first subset:
  determining the mobile computing device corresponding to the location update; and
  determining the time corresponding to the location update;
by a computing device, selecting a second subset of the location updates, wherein each of the location updates in the second subset corresponds to:
  a mobile computing device corresponding to a location update in the first subset; and
  a time within a threshold amount of time of the time corresponding to the location update in the first subset;
by a computing device, generating a probability map based on a distribution of geographic locations corresponding to the location updates in the second subset; and
by a computing device, defining one or more outer boundaries corresponding to the place based at least in part on the probability map; and
by a computing device, using the defined outer boundaries corresponding to the place and the geographic locations of each of the users to determine whether each of the users are visitors of the place.

2. The method of claim 1, further comprising storing the one or more outer boundaries in one or more map data stores of a computing device.

3. The method of claim 1, wherein the centroid region is defined by a predetermined radius with respect to a centroid point of the distribution of the plurality of geographic locations associated with the plurality of check-ins.

4. The method of claim 3, wherein the centroid region is defined by a shape such that a predetermined proportion of the geographic distributions are within a predetermined distance of the centroid region.

5. The method of claim 1, wherein the plurality of location updates are received during a predetermined time period.

6. The method of claim 1, wherein each location update further comprises user information associated with a user of the mobile computing device.

7. The method of claim 6, wherein the plurality of location updates are filtered by one or more demographic characteristics of the one or more users.

8. The method of claim 1, wherein the place is a pathway.

9. The method of claim 8, wherein the plurality of location updates along a pathway are determined based on a moving speed calculated for each location update.

10. The method of claim 1, wherein the place is associated with a geographic area defined in one or more map data stores accessible by the computing device.

11. The method of claim 1, wherein the place is not associated with a geographic area defined in one or more map data stores accessible by the computing device.

12. The method of claim 11, wherein the geographic area and the place are added to one or more map data stores accessible by the computing device.

13. The method of claim 12, wherein the geographic area and the place are further associated with one or more demographic characteristics of users sending location updates from the geographic area.

14. The method of claim 12, further comprising sending a query to one or more users corresponding to location updates within the geographic area, the query comprising a request for further defining information associated with the geographic area.

15. The method of claim 1, further comprising validating the probability map based at least in part on a comparison of the probability map with the second subset of location updates.

16. The method of claim 15, wherein the probability map is adjusted based at least in part on the comparison.

17. The method of claim 15, wherein the one or more boundaries are adjusted based at least in part on the comparison.

18. One or more non-transitory, computer-readable storage media embodying software that is operable when executed to:
  select a plurality of location updates corresponding to a place in order to determine a probability that one or more users are visitors of the place, the plurality of location updates being received from one or more mobile computing devices respectively corresponding to one or more users, wherein each location update comprises:
    data indicating a geographic location that a user was at; and
    a time stamp indicating a time when the user was at the geographic location;
  determine a plurality of check-ins at the place by one or more users on an online social network, wherein each of the plurality of check-ins is associated with a geographic location
  calculate a centroid region corresponding to the place, wherein the centroid region is determined based on the distribution of the plurality of geographic locations associated with the plurality of check-ins;
  select a first subset of the location updates, wherein the location updates in the first subset correspond to geographic locations within the centroid region;
  for each of one or more of the location updates in the first subset:
    determine the mobile computing device corresponding to the location update; and
    determine the time corresponding to the location update;
  select a second subset of the location updates, wherein each of the location updates in the second subset corresponds to:
    a mobile computing device corresponding to a location update in the first subset; and
    a time within a threshold amount of time of the time corresponding to the location update in the first subset;
  generate a probability map based on a distribution of geographic locations corresponding to the location updates in the second subset;
  define one or more outer boundaries corresponding to the place based at least in part on the probability map; and
  use the defined outer boundaries corresponding to the place and the geographic locations of each of the users to determine whether each of the users are visitors of the place.

19. A system comprising:
  one or more processors; and
  a memory coupled to the processors comprising instructions executable by the processors, the processors being operable when executing the instructions to:
    select a plurality of location updates corresponding to a place in order to determine a probability that one or more users are visitors of the place, the plurality of location updates being received from one or more mobile computing devices respectively corresponding to one or more users, wherein each location update comprises:
data indicating a geographic location that a user was at; and
a time stamp indicating a time when the user was at the geographic location;
determine a plurality of check-ins at the place by one or more users on an online social network, wherein each of the plurality of check-ins is associated with a geographic location
calculate a centroid region corresponding to the place, wherein the centroid region is determined based on the distribution of the plurality of geographic locations associated with the plurality of check-ins;
select a first subset of the location updates, wherein the location updates in the first subset correspond to geographic locations within the centroid region;
for each of one or more of the location updates in the first subset:
determine the mobile computing device corresponding to the location update; and
determine the time corresponding to the location update;
select a second subset of the location updates, wherein each of the location updates in the second subset corresponds to:
a mobile computing device corresponding to a location update in the first subset; and
a time within a threshold amount of time of the time corresponding to the location update in the first subset;
generate a probability map based on a distribution of geographic locations corresponding to the location updates in the second subset;
define one or more outer boundaries corresponding to the place based at least in part on the probability map; and
use the defined outer boundaries corresponding to the place and the geographic locations of each of the users to determine whether each of the users are visitors of the place.

* * * * *